US011904891B2

(12) United States Patent
Stenson et al.

(10) Patent No.: US 11,904,891 B2
(45) Date of Patent: Feb. 20, 2024

(54) OBJECT TRACKING BY GENERATING VELOCITY GRIDS

(71) Applicant: GM Cruise Holdings LLC, San Francisco, CA (US)

(72) Inventors: Richard Stenson, San Mateo, CA (US); Minhao Xu, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 189 days.

(21) Appl. No.: 17/219,755

(22) Filed: Mar. 31, 2021

(65) Prior Publication Data

US 2022/0315036 A1 Oct. 6, 2022

Related U.S. Application Data

(63) Continuation of application No. 17/219,458, filed on Mar. 31, 2021, now Pat. No. 11,801,865.

(51) Int. Cl.
*B60W 60/00* (2020.01)
*G06V 10/75* (2022.01)
(Continued)

(52) U.S. Cl.
CPC ...... *B60W 60/0011* (2020.02); *B60W 60/001* (2020.02); *G01S 17/42* (2013.01); *G01S 17/58* (2013.01); *G01S 17/894* (2020.01); *G06T 17/20* (2013.01); *G06V 10/751* (2022.01); *G06V 20/40* (2022.01); *G06V 20/58* (2022.01); *B60W 2420/403* (2013.01); *B60W 2420/52* (2013.01); *B60W 2554/4049* (2020.02)

(58) Field of Classification Search
CPC ........... B60W 60/0011; B60W 60/001; B60W 2554/4049; B60W 2420/52; B60W 2420/403; G01S 17/894; G01S 17/42; G01S 17/58; G06V 20/58; G06V 20/40; G06V 10/751; G06T 17/20
See application file for complete search history.

(56) References Cited

U.S. PATENT DOCUMENTS

| 2020/0074233 | A1* | 3/2020 | England | G06T 7/246 |
| 2020/0307561 | A1* | 10/2020 | Bush | G05D 1/0221 |
| 2020/0339109 | A1 | 10/2020 | Hong et al. | |

* cited by examiner

*Primary Examiner* — James M McPherson
*Assistant Examiner* — Bakari Underwood
(74) *Attorney, Agent, or Firm* — Novak Druce Carroll LLP

(57) ABSTRACT

A computer-implemented method is provided for creating a velocity grid using a simulated environment for use by an autonomous vehicle. The method may include simulating a road scenario with simulated objects. The method may also include recording image data collected from a camera sensor, the image data comprising a first 2D image frame comprising the simulated objects made up of a plurality of pixels. The method may also include identifying a first 3D point on the first simulated object in a 3D view of the simulated road scenario, wherein the first 3D point corresponds to the first pixel in the first 2D image frame. The method may also include generating a velocity of the first point based upon a velocity of the first simulated object, and projecting the velocity back into the first 2D image frame. The method may further include encoding the velocity for the first pixel prior to a simulated movement of the simulated object with respect to a second pixel after the simulated movement of the simulated object in a 2D velocity grid.

20 Claims, 11 Drawing Sheets

(51) Int. Cl.
*G06V 20/40* (2022.01)
*G06V 20/58* (2022.01)
*G06T 17/20* (2006.01)
*G01S 17/894* (2020.01)
*G01S 17/42* (2006.01)
*G01S 17/58* (2006.01)

OBJECT TRACKING BY GENERATING VELOCITY GRIDS

TECHNICAL FIELD

The subject technology generally pertains to more accurately generating velocity grids, and more specifically pertains to creating the more accurate velocity grid using a simulated environment.

BACKGROUND

An autonomous vehicle is a motorized vehicle that can navigate without a human driver. An exemplary autonomous vehicle includes a plurality of sensor systems, such as but not limited to, a camera sensor system, a Light Detection and Ranging (LiDAR) sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

A velocity grid is a collection of data that indicates velocity at various points. In the case of an autonomous vehicle (AV), a velocity grid can be used to provide a reference to the autonomous vehicle's internal computing system to understand the nature of another object's movement based on a pattern occurring in a velocity grid. Conventionally, a velocity grid is manually generated. For example, a person would label estimated velocity grid information. For two-dimensional (2D) velocity estimates a person would move an object or an image of an object a small amount to emulate motion in 2D. These velocity estimates are often not precise. For three-dimensional (3D) velocity estimates, a person would manually move an object, or LiDAR points making up the object a small amount in 3D to emulate motion in 3D.

There remains a need for developing methods for velocity grid generation.

BRIEF SUMMARY

In one aspect, a computer-implemented method is provided for creating a velocity grid using a simulated environment for use by an autonomous vehicle. The method may include simulating a road scenario with simulated objects. The method may also include recording image data collected from a camera sensor, the image data comprising a first 2D image frame comprising the simulated objects made up of a plurality of pixels. The method may also include identifying a first 3D point on the first simulated object in a 3D view of the simulated road scenario, wherein the first 3D point corresponds to the first pixel in the first 2D image frame. The method may also include generating a velocity of the first point based upon a velocity of the first simulated object, and projecting the velocity back into the first 2D image frame. The method may further include encoding the velocity for the first pixel prior to a simulated movement of the simulated object with respect to a second pixel after the simulated movement of the simulated object in a 2D velocity grid.

In another aspect, a system is provided for creating a velocity grid using a simulated environment for use by an autonomous vehicle. The system may include one or more processors. The system may also include a computer-readable medium comprising instructions stored therein, which when executed by one or more processors, cause the processors to: simulate a road scenario with simulated objects, record image data collected from a camera sensor, the image data comprising a first 2D image frame comprising the simulated objects made up of a plurality of pixels, identify a first 3D point on the first simulated object in a 3D view of the simulated road scenario, wherein the first 3D point corresponds to the first pixel in the first 2D image frame, generate a velocity of the first point based upon a velocity of the first simulated object, project the velocity back into the first 2D image frame, and encode the velocity for the first pixel prior to a simulated movement of the simulated object with respect to a second pixel after the simulated movement of the simulated object in a 2D velocity grid.

In a further aspect, a non-transitory computer-readable storage medium may include a storage configured to store instructions. The medium may also include a processor configured to execute the instructions and cause the processor to: simulate a road scenario with simulated objects, record image data collected from a camera sensor, the image data comprising a first 2D image frame comprising the simulated objects made up of a plurality of pixels, identify a first 3D point on the first simulated object in a 3D view of the simulated road scenario, wherein the first 3D point corresponds to the first pixel in the first 2D image frame, generate a velocity of the first point based upon a velocity of the first simulated object, project the velocity back into the first 2D image frame, and encode the velocity for the first pixel prior to a simulated movement of the simulated object with respect to a second pixel after the simulated movement of the simulated object in a 2D velocity grid.

Additional aspects, embodiments, and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form to facilitate describing one or more aspects. Further, it is to be understood that functionality that is described as being carried out by certain system components may be performed by more or fewer components than shown.

The disclosed technology addresses the need in the art for a better velocity grid representing movements of objects perceived by an autonomous vehicle. In particular, velocity grids prepared by prior art methods are not sufficiently precise. The present technology includes methods for creating velocity grids in a simulation where the velocity of points on objects can be known or calculated with better precision. Thereby, more accurate data can be reflected in velocity grids prepared by the present technology described herein. This disclosure provides methods for generating or calculating velocity data for each point that is representative of a portion of a simulated object and tracking the movement of each point during the movement of the simulated object in a simulated environment. The movement of the simulated object may include rotations, or turns, or movements on linear or curved trajectories, forward or backward movements, up or down movements, among others.

The velocity grid created using the methods described herein is further useful in improving the training of an autonomous vehicle to recognize object movements. When a velocity grid created using the methods described herein is used to train a machine-learning algorithm used by autonomous vehicles for autonomous piloting thereon, the autonomous vehicles demonstrate an improved object tracking by 20%. The improvement in accuracy of the object tracking is more noticeable especially in situations where the object or simulated object moves on a curved trajectory. For example, vehicles, bikes, scooters, skateboards may make a sudden turn or change lanes.

Accordingly, the present technology provides an improvement in creating a more accurate velocity grid, and the use of the velocity grid provides improvements in certain functions performed by autonomous vehicles.

Figure 1:
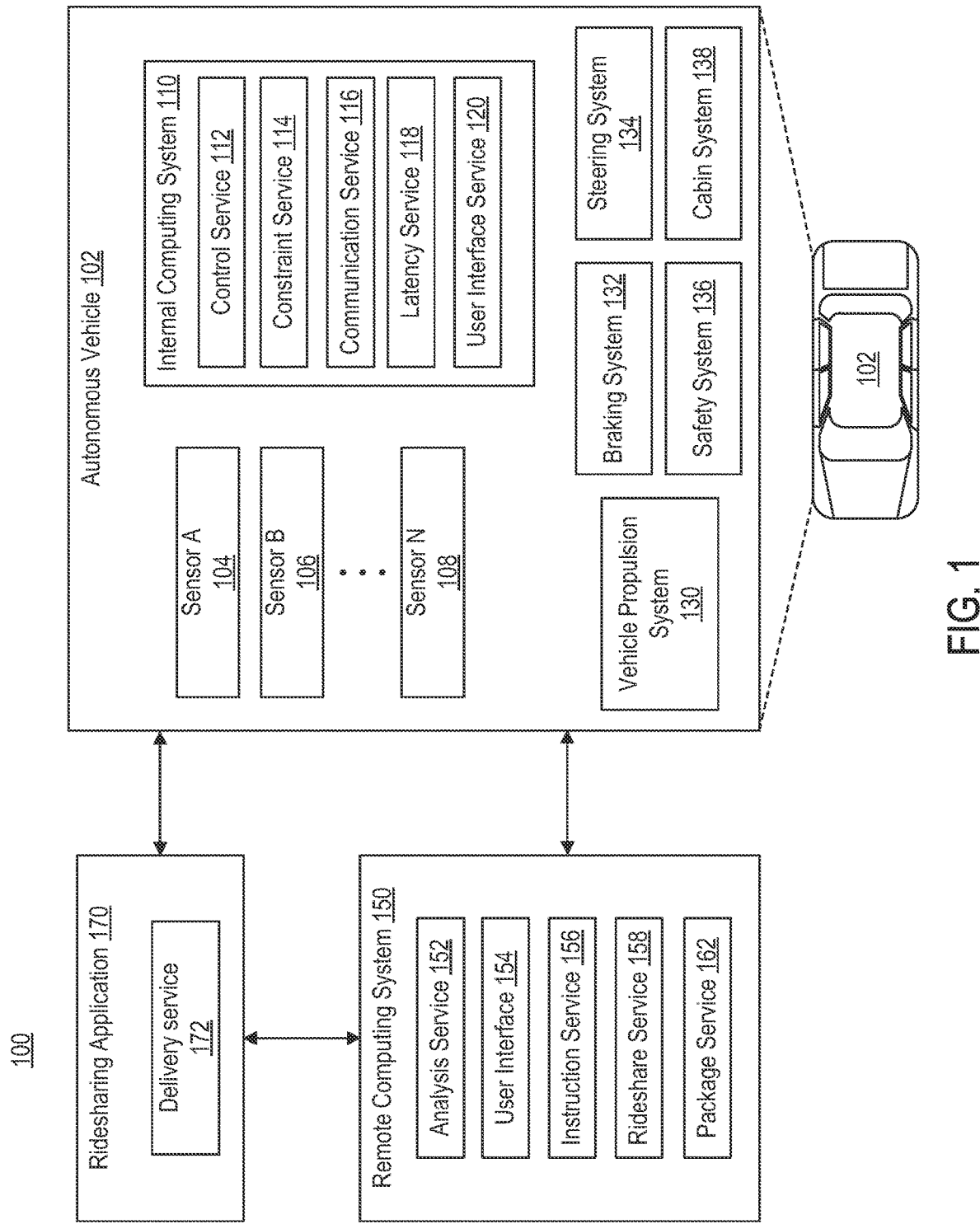
FIG. 1 illustrates an example environment that includes an autonomous vehicle in communication with a remote computing system, in accordance with some aspects of the disclosed technology.

FIG. 1 illustrates environment 100 that includes an autonomous vehicle 102 in communication with a computing system 150. The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 102 through an Nth sensor system 104). The sensor systems 104-106 are of different types and are arranged about the autonomous vehicle 102. For example, the first sensor system 104 may be a camera sensor system, and the Nth sensor system 106 may be a LiDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate the appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the mechanical systems 130, 132, 134. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 206, the braking system 208, the steering system 210, the safety system 136, and the cabin system 138. The control service 112 receives sensor signals from the sensor systems 202-204 as well communicates with other services of the internal computing system 110 to effectuate operation of the autonomous vehicle 102. In some embodiments, control service 112 may carry out operations in concert with one or more other systems of autonomous vehicle 102.

The internal computing system 110 can also include a constraint service 114 to facilitate the safe propulsion of the autonomous vehicle 102. The constraint service 116 includes instructions for activating a constraint-based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112. The internal computing system 110 can also include a communication service 116. The communication service can include both software and hardware elements for transmitting and receiving signals from/to the remote computing system 250. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine-learning algorithms, requesting assistance from a remote computing system or a human operator via remote computing system, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine-learning algorithms, requesting assistance from remoting computing system or a human operator via the remote computing system 150, software service updates, ridesharing pickup and drop off instructions, etc.

The remote computing system 150 includes an analysis service 152 that is configured to receive data from autonomous vehicle 102 and analyze the data to train or evaluate machine-learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As introduced above, the present technology pertains to creating an improved velocity grid using simulations of a moving object to create the velocity grid. Further, the present technology pertains to utilizing the improved velocity grid to train autonomous vehicles to track other vehicles or simulated objects and to recognize the movements of these other vehicles.

In some aspects, the present technology includes creating a 2D velocity grid which is obtained by identifying a pixel in a first 2D image frame that displays a portion of an object and embedding a velocity associated with that pixel as the portion of the object moves in a simulation. Creating the velocity of the portion of the object in a simulation is more accurate than manually creating a velocity grid.

Figure 2:
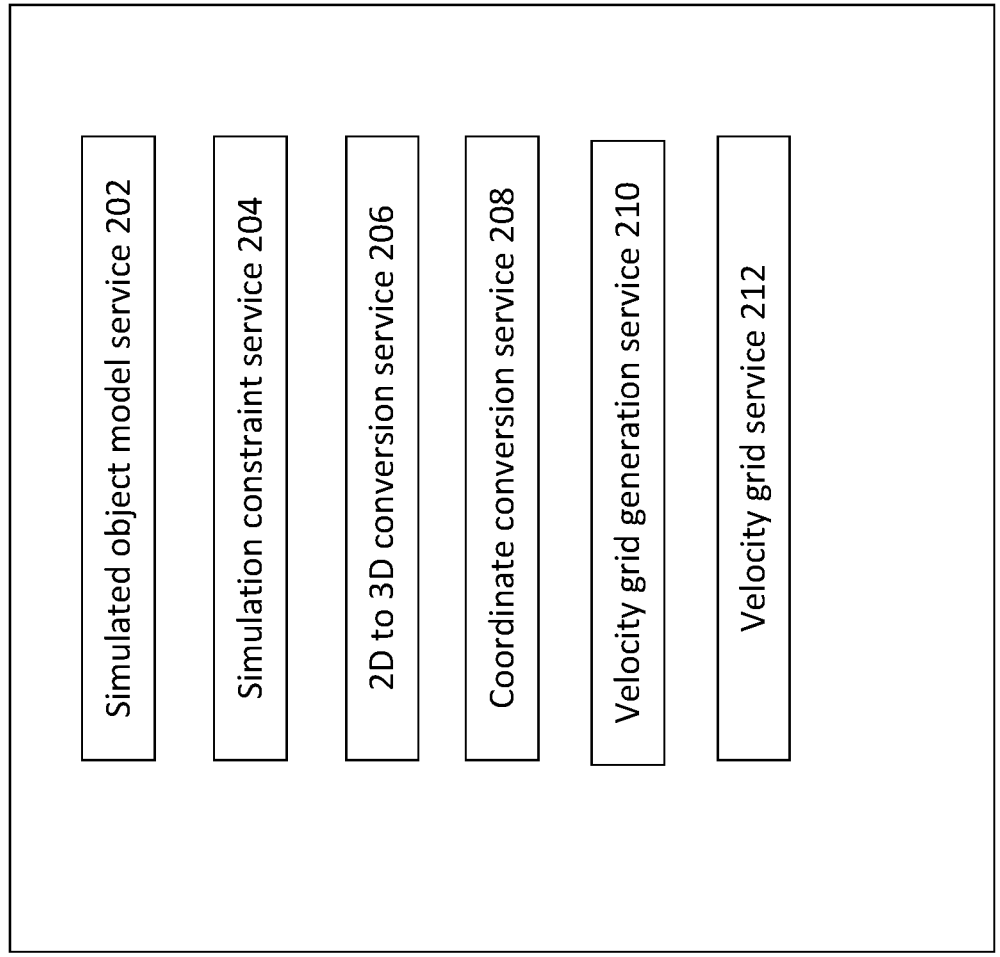
FIG. 2 illustrates an example system diagram of a simulation engine, in accordance with some aspects of the disclosed technology.

FIG. 2 illustrates an example system diagram of a simulation engine, in accordance with some aspects of the disclosed technology. A simulation engine 200 may include various software services made up of algorithms for performing various operations using a processor.

The simulation engine 200 may include a simulated object model service 202 for modeling an appearance and behaviors of simulated objects in the simulated environment. The simulated object model service 202 may include shapes, dimensions, and properties of the simulated objects. The properties may include reflectance of the surfaces making up the simulated object. For example, the object might include surfaces such as a body frame of a vehicle, a headlight or a tail light, or a window. The reflectance varies with the body frame, headlight or trail light, or window. For example, the window of the vehicle may have a zero reflectance. The simulated object model service 202 may also include algorithms that define how a simulated object moves during various maneuvers such as acceleration, braking, turns, etc.

The simulation engine 200 may also include a simulation constraint service 204, which can define the physical properties of the environment including a friction forces or a road service, gravity or other parameter that requires simulated objects to remain connected to the ground, etc.

The simulation engine 200 may also include a 2D to 3D conversion service 206 for converting from 2D to 3D and from 3D to 2D views.

The simulation engine 200 may also include a coordinate conversion service 208 for transforming a plurality of points from a simulated-scene frame-of-reference to a simulated object frame-of-reference.

The simulation engine 200 may also include a velocity grid generation service 210. The velocity grid generation service 210 for identifying points on a simulated object and tracking the points over a time interval and determining the velocity of the respective points. In some embodiments, the velocity grid generation service 210 can utilize one or more other services of the simulation engine such as the 2D to 3D conversion service 206 or the coordinate conversion service 208 to for determining the velocity of the respective points representative of a portion of a simulated object. The velocity grid generation service 210 can further create a velocity grid for the simulated objects.

The simulation engine 200 may further include a velocity grid service 212 for providing a finished velocity grid to AVs during simulated driving scenarios.

It will be appreciated by those skilled in the art that the simulation engine may include other algorithms to perform the operations of the present technology.

Figure 3:
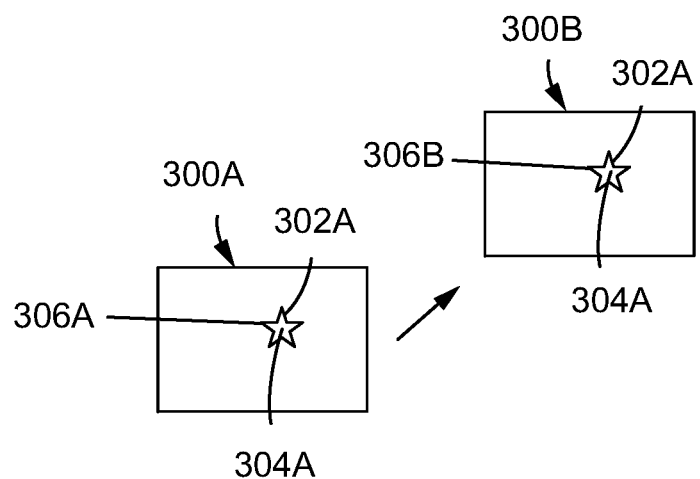
FIG. 3 illustrates a first 2D image frame including a simulated object at a first location and a second 2D image frame including the simulated object at a second location for generation of a 2D velocity grid in accordance with some aspects of the disclosed technology.

FIG. 3 illustrates a first 2D image frame including a simulated object at a first location and a second 2D image frame including the simulated object at a second location for the generation of a 2D velocity grid, in accordance with some aspects of the disclosed technology. The image frame 300A and image frame 300B can be captured from simulated camera sensors from a point of view of an autonomous vehicle. As shown in FIG. 3, a first 2D image frame 300A includes a simulated object 302A having a reference point 304A (e.g. mass center) at a first location. The first 2D image 300A includes a plurality of pixels representative of the simulated object 302A. One of the plurality of pixels is representative of a portion 306A of the simulated object 302A. The reference point 304A has a known velocity of the simulated object 302A, while the portion 306A's velocity is generated and may vary with a particular portion of the simulated object 302A. As shown, the simulated object 302A in the first 2D image moves from the first location to a second location. A second image frame 300B includes the simulated object 302A having the reference point 304A at the second location, which is spaced apart from the first location.

The velocity of the portion 306A as the simulated object 302A moves between the first location and the second location can be determined from the simulation engine, from which image frames 300A and 300B are derived. In a 3D simulation, a 3D velocity of the reference point 304A of the simulated object 302A is known or can be accurately calculated from parameters of the simulation and/or models providing for movement of the simulated object in the simulation. It will be appreciated by those skilled in the art that the reference point may be any point that is representative of a portion of the simulated object.

In order to obtain the velocity of the portion 306A of the simulated object 302A in the 2D frames from the 3D simulation, the portion 306A in the 2D frame needs to be located or identified in the 3D simulation. This can be achieved using known methods provided by some 3D graphics rendering tools.

Figure 4:
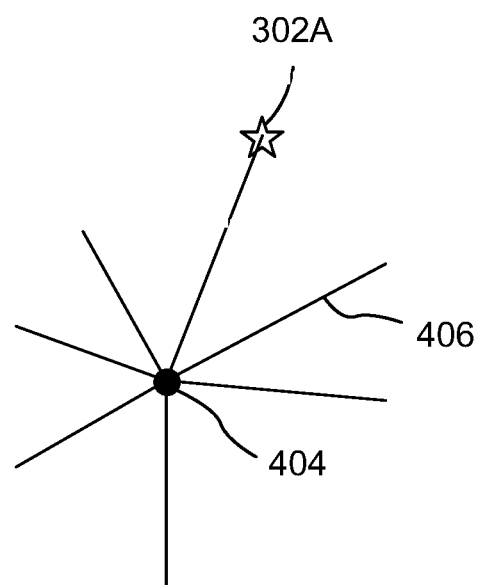
FIG. 4 illustrates a simulated LiDAR sensor sending light rays that intersect with the simulated object in the first 2D image frame of FIG. 2 in accordance with some aspects of the disclosed technology.

FIG. 4 illustrates a simulated LiDAR sensor sending light rays (e.g. laser) that intersect with the simulated object 202A in a 3D simulation, in accordance with some aspects of the disclosed technology. FIG. 4 illustrates a simulated 3D scene from which image frames 300A and 300B were captured by simulated LiDAR sensors 404 from the point of view of a simulated autonomous vehicle. The simulated LiDAR sensors 404 were mounted on the simulated autonomous vehicle. The simulated autonomous vehicle can determine a first distance of the simulated object 302A from the simulated LiDAR sensors 404 as known in the art. It is important to determine the distance from a portion of the simulated object 302A during a simulated movement of the simulated object 302A from a first location to a second location. This would help track the portion of the simulated object 302A and determine the velocity of the portion of the simulated object 302A. As shown in FIG. 4, light rays 406 were sent in various directions from simulated LiDAR sensors 404. Some rays 406 intersect with the simulated object 302A. The rays returned to the LiDAR sensors 404 determined the first distance of the simulated object 302A, and more specifically the portion 306A, from the LiDAR sensors 404.

The simulation engine 200 can simulate the movements of the simulated object 202A. In the simulation, a 3D velocity of the reference point 204A of the simulated object 202A is known or can be accurately calculated from parameters of the simulation and/or models providing for the movement of a simulated object in the simulation.

The velocity in a velocity grid can be represented by a vector in 3D space or 3D coordinates, such as X, Y, Z coordinates in which an X-axis, a Y-axis, and a Z-axis are orthogonal to each other. The velocity vector includes both the speed (e.g. velocity value) and direction of the movement in the 3D space. Next, the velocity vector is projected back to a 2D image frame to provide a 2D velocity vector, which is then encoded with the pixel representative of a portion of the simulated object along with the distance of the pixel from the AV where the LiDAR sensor is mounted and stored in a memory device.

Figure 5:
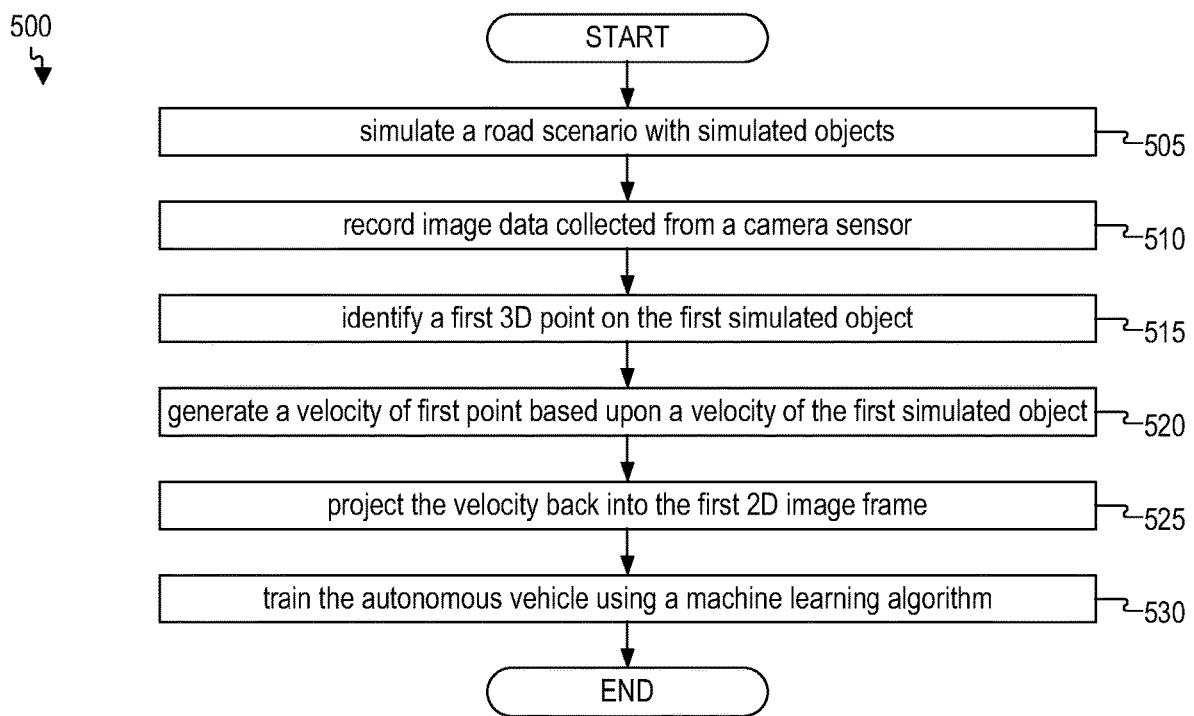
FIG. 5 is an example flow chart for creating a 2D camera based velocity grid of a simulated object in a simulated environment for use by an autonomous vehicle in accordance with some aspects of the disclosed technology.

FIG. 5 illustrates an example method 500 for creating a 2D velocity grid using a simulated environment for use by an autonomous vehicle. Although the example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements the method 500 may perform functions at substantially the same time or in a specific sequence.

In accordance with some examples, the present technology includes simulating a road scenario with simulated objects at block 505. For example, the simulation engine 200 illustrated in FIG. 2 may simulate a road scenario with simulated non-player characters.

In accordance with some examples, the present technology includes recording image data collected from a simulated camera sensor, the image data comprising a first 2D image frame comprising the simulated objects made up of a plurality of pixels at block 510. For example, the simulation engine 200 illustrated in FIG. 2 may record or collect image data collected from a simulated camera sensor mounted on a simulated autonomous vehicle. The image data is a first 2D image frame comprising at least one simulated object in the simulation scene as represented by a plurality of pixels. An example of such an image is illustrated as FIG. 3. In some embodiments, the camera sensor can be a LiDAR sensor.

In accordance with some examples, the present technology includes identifying a first 3D point on the first simulated object in a 3D view of the simulated road scenario at block 515. For example, the simulation engine 200 illustrated in FIG. 2 may identify a first 3D point on the first simulated object in a 3D view of the simulated road scenario. The first 3D point corresponds to the first pixel in the first 2D image frame. More specifically, the simulation engine 200 can convert the first pixel, which represents a portion on the first simulated object, into a first 3D point to identify the same portion of the simulated object as represented in the 2D view in the 3D view of the same scene.

For the conversion from 2D to 3D, it is important to determine the distance from a portion of the simulated object 302A during a simulated movement of the simulated object 302A from a first location to a second location. As described with respect to FIG. 4, the simulated autonomous vehicle can determine a first distance of the portion 306A of the simulated object 302A from simulated LiDAR sensors 404. The first distance combining with the location of a first pixel in the first 2D image defines a first 3D point. The first pixel and the first 3D point are representative of the same portion or area of the simulated object 202A at a first location.

Similarly to determining the first distance of the portion 306A of the simulated object 302A at a first location, a second distance of the portion 306B of the simulated object 302A in the second 2D image frame 300B can also be determined from the LiDAR sensors. The second distance combining with the location of a second pixel in the second 2D image defines a second 3D point. The portion 306B in the second 2D image frame is identified as the same portion 306A in the first 2D image frame. The second pixel and the second 3D point are representative of the same portion or area of the simulated object 302A at a second location. The second pixel corresponds to the same area as the first pixel and is representative of the same portion 306A of the simulated object as the first pixel.

In some embodiments, the simulation including converting the 2D portion of the simulated object into the 3D portion can be achieved using known methods provided by some 3D graphics rendering tools.

In some embodiments, converting the 2D portion of the simulated object into the 3D portion can be achieved by the simulation engine determining the first 3D point that corresponds to the first pixel in the first 2D image frame based upon the intersection of the LiDAR rays and the first simulated object in the simulated road scenario.

After identifying a first 3D point at block 515, the simulation engine 200 may record or collect simulated LiDAR rays reflecting off the first 3D point representative of a portion of the first simulated object.

In accordance with some examples, the present technology includes determining a velocity of the first 3D point based upon the velocity of the first simulated object as it moves within the 3D simulation at block 520. For example, the simulation engine 200 illustrated in FIG. 2 may determine a velocity of the first point based upon the velocity of the first simulated object as it moves within the 3D simulation. More specifically, the simulation engine 200 illustrated in FIG. 2 may simulate a movement of the first simulated object in the simulated road scenario in accordance with one or more models that specify how the simulated object moves within the simulation.

As the simulated object moves, or after the simulated object moves, the simulation engine 200 illustrated in FIG. 2 may calculate the velocity of the first 3D point. In some embodiments, the velocity of the 3D point can be calculated based upon the velocity of a 3D reference point (e.g. center of mass) of the first simulated object and the simulated object models that specify how portions of the simulated object move relative to the center of mass as the simulated object makes specified maneuvers (merges into traffic, right and left turns, lane changes, forward motion, deceleration, etc.). In some embodiments, the velocity of the 3D reference point might be explicitly known based on simulated object model parameters.

The simulation engine 200 illustrated in FIG. 2 may record or collect a second 2D image frame after the simulated movement of the first simulated object. The distance of the simulated object in the second 2D image frame from a simulated autonomous vehicle including the simulated object is needed to show the location or 3D point representative of the portion of the simulated object in the 3D simulation. The portion of the simulated object in the second image is taken from the same point of view as the first 2D frame. The 3D point including the distance after the simulated object has moved in the simulation corresponds to a second pixel in the second 2D image frame. In some embodiments, the simulation engine 200 illustrated in FIG. 2 can project the second 3D point into the second 2D image frame. In some embodiments, projecting the second 3D point into the second 2D image frame can be achieved using known methods provided by some 3D graphics rendering tools.

In accordance with some examples, the present technology includes projecting the velocity back into the first 2D image frame at block 525. For example, the simulation engine 200 illustrated in FIG. 2 may project the velocity back into the first 2D image frame by labeling the first pixel with a velocity vector that specifies the velocity of the pixel (as a proxy for the reference portion in the 3D simulation) and the direction and amount of movement of the pixel representative a portion on the simulated object. The direction and amount of movement can be a line or vector from the location of the first pixel in the first frame to the location of the second pixel in the second 2D image frame when the two image frames are superimposed. In this way, a 2D velocity grid can be created when the velocity for the first pixel prior to the simulated movement of the simulated object is encoded into a frame with respect to the second pixel after the simulated movement of the simulated object in a 2D velocity grid. For example, the simulation engine 200 may encode the velocity for the first pixel prior to the simulated movement of the simulated object with respect to the second pixel after the simulated movement of the simulated object in a 2D velocity grid. The distance of the portion of the simulated object from an AV where the LiDAR sensors are mounted may be encoded with the 2D velocity grid. The simulation engine may also encode the distance with the first image frame in the 2D velocity grid.

In accordance with some examples, the present technology includes training a machine-learning algorithm, for use by the autonomous vehicle, using the created velocity grid at block 530. For example, the simulation engine 200 illustrated in FIG. 2 may be used to train the machine-learning algorithm utilizing the created 2D velocity grid in the simulated environment to correctly identify objects and classify their maneuvers. The created 2D velocity grid includes a velocity label and a distance label associated with a pixel representative of a portion of a simulated object or simulated object in the 2D image frame. The velocity label includes information about a velocity and direction in which the portion of the simulated object moved, and the distance label indicates how far the portion of the simulated object is from the LiDAR sensor of the autonomous vehicle. The 2D velocity grid includes such distance and velocity labeling for a plurality of pixels representing the simulated object and other simulated objects in the frame. In some aspects, the distance label might be inherent in the LiDAR data making up the pixel itself.

In some aspects, the velocity grid may be a 3D velocity grid including the velocity labeling for a plurality of 3D points that are representative of simulated objects.

Figure 6:
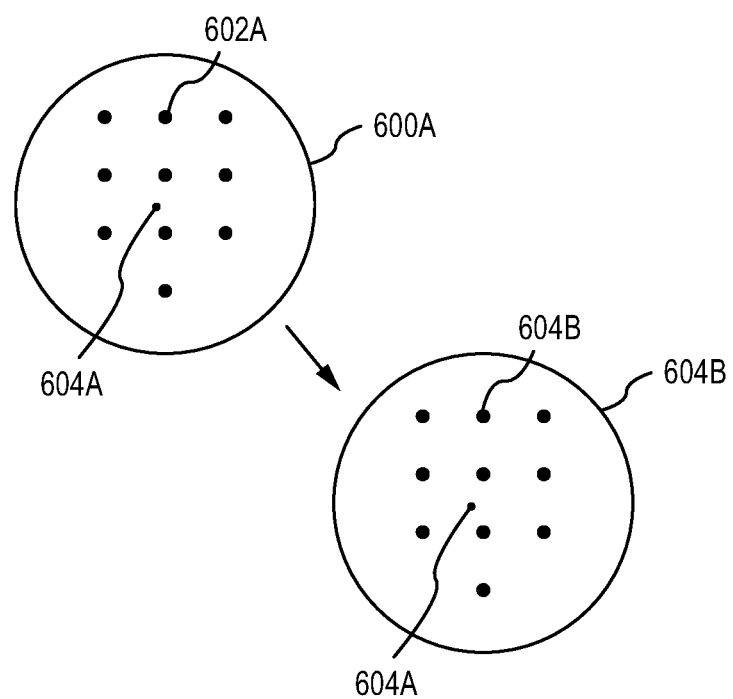
FIG. 6 illustrates a first example 3D point cloud representative of a simulated object at a first location and a second example 3D point cloud representative of the simulated object at a second location for generation of a 3D LiDAR-based velocity grid in accordance with some aspects of the disclosed technology.

FIG. 6 illustrates a first example 3D point cloud that is representative of a simulated object at a first location and a second example 3D point cloud that is representative of the simulated object at a second location for generation of a 3D LiDAR-based velocity grid in accordance with some aspects of the disclosed technology. A first example 3D point cloud 600A includes a first plurality of 3D points at a first location. A second example 3D point cloud 600B includes a second plurality of 3D points at the second location. As shown in FIG. 6, a simulated object is represented by a first plurality of 3D points 602A at the first location and is represented by a second plurality of 3D points 602B at the second location. The simulated object has a mass center or 3D reference point 604A at the first location. The velocity of one of the 3D points 602A can be calculated based upon the simulated movement of the simulated object from the first location to the second location in a simulated environment.

Figure 7:
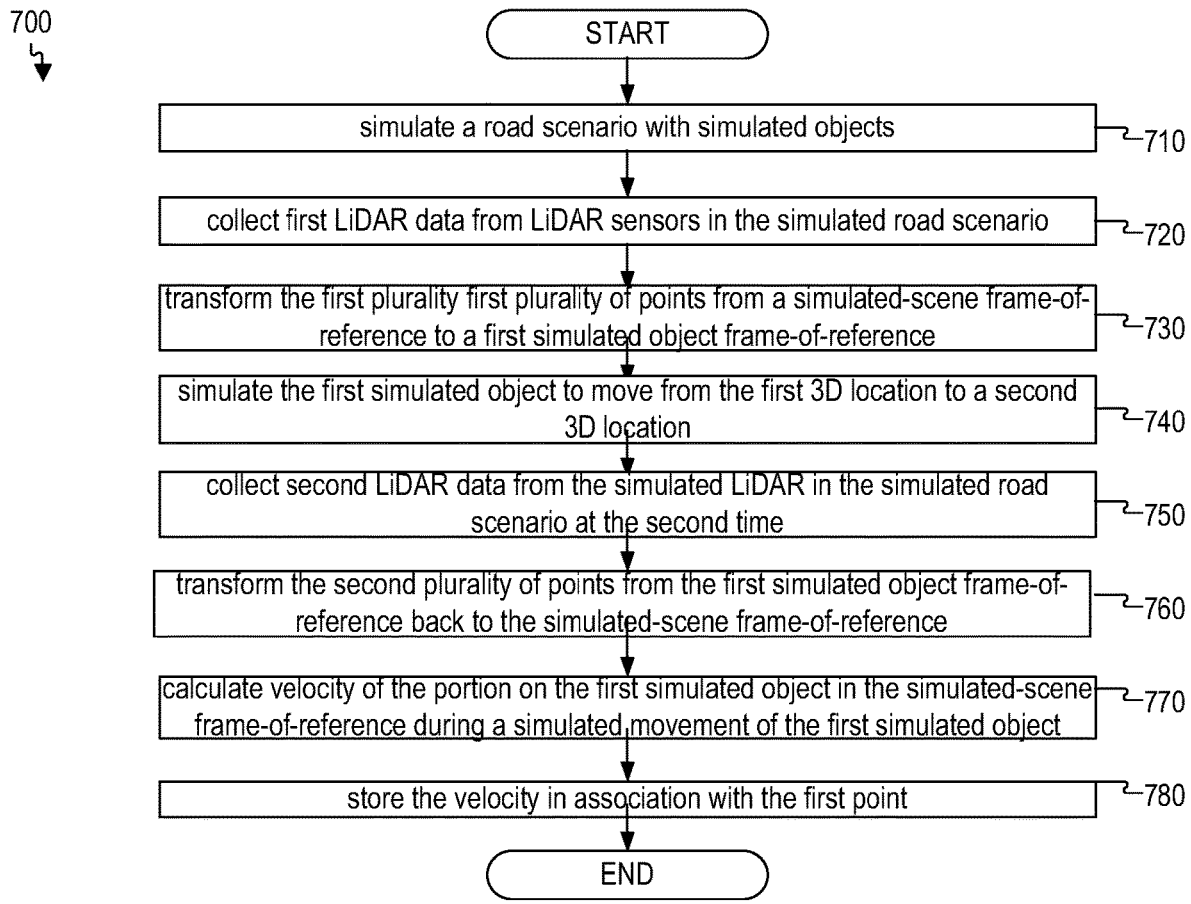
FIG. 7 is an example flow chart for creating a 3D velocity grid of a simulated object in a simulated environment for use by an autonomous vehicle in accordance with some aspects of the disclosed technology.

FIG. 7 is an example flow chart for creating a 3D velocity grid of a simulated object in a simulated environment for use by an autonomous vehicle in accordance with some aspects of the disclosed technology. Although the method 700 depicts a particular sequence of operations, the sequence may be altered without departing from the scope of the present disclosure. For example, some of the operations depicted may be performed in parallel or in a different sequence that does not materially affect the function of method 700. In other examples, different components of an example device or system that implements the method 700 may perform functions at substantially the same time or in a specific sequence.

In accordance with some examples, the present technology includes simulating a road scenario with simulated object at block 710. For example, the simulation engine 200 illustrated in FIG. 2 may simulate a road scenario with simulated non-player characters or simulated objects. The simulated objects may include vehicles, buildings, pedestrians, bikes, scooters, skateboards, among others. The road scenario may include streets, intersections of the streets. The streets may be straight or curved, narrow or wide. The streets might also may have steep slopes or flats.

In accordance with some examples, the present technology includes collecting first LiDAR data from LiDAR sensors in the simulated road scenario at block 720. For example, the simulation engine 200 illustrated in FIG. 2 may collect first LiDAR data from a simulated LiDAR in the simulated road scenario. The collected first LiDAR data at block 720 includes a first plurality of points that are representative of a first simulated object at a first 3D location and a first time. The collected first LiDAR data includes a first plurality of points that are representative of a first simulated object at a first 3D location and a first time. In some embodiments, the simulation engine 200 may further capture light rays that simulate the LiDAR sensors and determine a first intersection between the light rays and the first simulated object at the first 3D location in the simulated road scenario. The first intersection defines a first point in the plurality of points that are representative of the first simulated object at the first 3D location. The first point is one of the plurality of points representing the first simulated object, where the first point represents a portion of the first simulated object. The first plurality of points are in a first 3D frame.

In accordance with some examples, the present technology includes transforming the first plurality of points from a simulated-scene frame-of-reference to a first simulated object frame-of-reference at block 730, such that the first plurality of points in a simulated-scene frame-of-reference coordinate can be changed or switched to a first simulated object frame-of-reference coordinate. For example, the simulation engine 200 is illustrated in FIG. 2 may transform the first plurality of points from a simulated-scene frame-of-reference to a first simulated object frame-of-reference. More specifically, the simulated scene frame-of-reference includes X, Y, Z coordinates for a portion of a simulated object with respect to a simulated scene. A simulated object frame-of-reference includes X', Y', Z' coordinates with respect to the simulated object at a first location in the scene that correspond to the same portion of the simulated object as X, Y, Z. When the simulated object moves to a second location, the X', Y', Z' coordinates in the simulated object frame-of-reference continue to represent the same portion of the simulated object as they did before the simulated object moved. However, in the scene frame-of-reference, the same portion of the simulated object at a different location would be represented by different coordinates because the portion of the simulated object is at a different location with respect to the scene. Accordingly, a benefit for transforming into the simulated object frame-of-reference is that the relative positions of the first plurality of points in the simulated object frame-of-reference are maintained during the movement of the simulated object and they can be easily tracked.

In accordance with some examples, the present technology includes simulating the first simulated object to move from the first 3D location to a second 3D location within the simulated road scenario between the first time and a second time at block 740. For example, the simulation engine 200 illustrated in FIG. 2 may simulate the first simulated object to move from the first 3D location to a second 3D location within the simulated road scenario between the first time and a second time. More specifically, the simulation engine 200 illustrated in FIG. 2 may simulate a movement of the simulated object in the simulated road scenario in accordance with one or more models that specify how the simulated object moves within the simulation. The relative position of the first point on the first simulated object in the simulated object frame-of-reference is maintained during the simulated movement of the first simulated object.

According to some examples, the present technology includes collecting second LiDAR data from the LiDAR sensors in the simulated road scenario at the second time at block 750. For example, the simulation engine illustrated in FIG. 2 may collect second LiDAR data from the simulated LiDAR in the simulated road scenario at the second time.

The collected second LiDAR data may include a second plurality of points that are representative of the first simulated object at the second 3D location. The simulation engine 200 may further capture light rays that simulate the LiDAR sensors and determine a second intersection between the light rays and the first simulated object at the second 3D location in the simulated road scenario, similar to capturing light rays for the first LiDAR data and determining the first intersection as described above. Due to tracking the movement of the simulated object in the simulated object frame-of-reference, the simulation engine 200 can identify the portion of the simulated object represented by the first point when the simulated object is at the second location and record or collect LiDAR data corresponding to that portion of the simulated object. The second intersection corresponds to the first point on the simulated object and defines the second point in the plurality of points that are representative of the first simulated object at the second 3D location. The second plurality of points are in a second 3D frame.

According to some examples, the present technology includes transforming the second plurality of points from the first simulated object frame-of-reference back to the simulated-scene frame-of-reference at block 760. For example, the simulation engine 200 may transform the second plurality of points from the first simulated object frame-of-reference back to the simulated-scene frame-of-reference. As such, the positions of the first simulated object at the first location and the second location are both in the simulated-scene frame-of-reference or the X-Y-Z coordinates. Having the first position and second position both in the simulated-scene frame-of-reference is necessary because the portion of the simulated object only moves in the simulated-scene frame-of-reference.

According to some examples, the present technology includes calculating the velocity of the portion on the first simulated object in the simulated-scene frame-of-reference during a simulated movement of the first simulated object from the first 3D location to the second 3D location at block 770. For example, the simulation engine 200 may calculate the velocity of the portion on the first simulated object in the simulated-scene frame-of-reference during a simulated movement of the first simulated object from the first 3D location to the second 3D location.

In some variations, if velocity of simulated object is assumed unknown, the simulation engine 200 can use numerical methods for Ordinary Differential Equation (ODEs) to find the velocity of the simulated object. The simulation engine 200 can calculate the velocity from the first location to a second location in the simulated-scene frame-of-reference. In particular, velocities in X-Y-Z coordinates can be calculated based upon distances between the positions of the first point and the second point in each of the X, Y, and Z-axes and time for the movement. This provides a velocity vector.

In some variations, the velocity of the first simulated object is assumed to be known. For example, a reference point of the first simulated object has a velocity known by the simulation engine, such as the mass center of the first simulated object. The first simulated object is assumed to be a rigid body. Then, the velocity for each of the plurality of 3D points that are representative of the first simulated object can be determined based upon the velocity of the reference point of the first simulated object in conjunction with a model for movement of the simulated object used by the simulation engine.

In accordance with some examples, the present technology includes storing the velocity in association with the first point prior to the simulated movement of the simulated object with respect to a second point after the simulated movement of the first simulated object in a 3D velocity grid for the simulated objects at block 760. For example, the simulation engine 200 illustrated in FIG. 2 may store the velocity in association with the first point prior to the simulated movement of the simulated object with respect to a second point after the simulated movement of the first simulated object in a 3D velocity grid for the simulated objects.

According to some examples, the present technology includes storing the velocity in association with the first point prior to the simulated movement of the simulated object with respect to the second point after the simulated movement of the first simulated object in a 3D velocity grid for the simulated objects at block 780. For example, the simulation engine may store the velocity in association with the first point prior to the simulated movement of the simulated object with respect to the second point after the simulated movement of the first simulated object in a 3D velocity grid for the simulated objects.

In accordance with some examples, the present technology includes training a machine-learning algorithm, for use by the autonomous vehicle, using the 3D velocity grid. For example, the simulation engine 200 illustrated in FIG. 2 may be used to train the machine-learning algorithm utilizing the 3D velocity grid in the simulated environment to correctly identify objects and classify their maneuvers. The created 3D velocity grid includes a velocity generated for a 3D point representative of a portion of a simulated object in a simulated environment. The 3D velocity grid includes the velocity for a plurality of 3D points that are representative of simulated objects.

Figure 8:
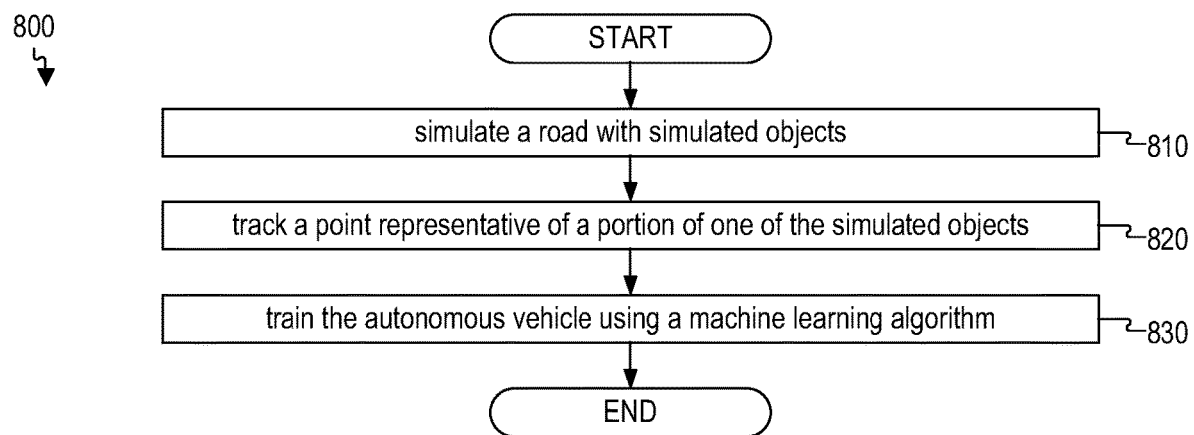
FIG. 8 is an example flow chart for creating a velocity grid of a simulated object in a simulated environment for use by an autonomous vehicle in accordance with some aspects of the disclosed technology.

FIG. 8 is an example flow chart for creating a velocity grid of a simulated object in a simulated environment for use by an autonomous vehicle in accordance with some aspects of the disclosed technology. Although the example method 800 depicts a particular sequence of operations, the sequence may be altered without departing from the scope of the present disclosure. For example, some of the operations depicted may be performed in parallel or in a different sequence that does not materially affect the function of method 800. In other examples, different components of an example device or system that implements the method 800 may perform functions at substantially the same time or in a specific sequence.

In accordance with some examples, the present technology includes simulating a road scenario with simulated objects at block 810. For example, the simulation engine 200 illustrated in FIG. 2 may simulate a road scenario with simulated non-player characters.

In accordance with some examples, the present technology includes tracking a point representative of a portion of one of the simulated objects in the simulated road scenario at block 820. For example, the simulation engine 200 illustrated in FIG. 2 may track a point representing of a portion of one of the simulated objects in the simulated road scenario. The point representing of the portion of one of the simulated objects moves from a first location to a second location during a time period. The simulation engine 200 can determine the velocity of the point as it moves from the first location to the second location during the time period.

It is important to determine the velocity for each pixel representative of a portion of a simulated object as described above with respect to FIG. 5 or each 3D point representative of a portion of a simulated object as described above with respect to FIG. 7. The vehicle may be perceived as moving at a single velocity if the vehicle moves on a straight street without any turns. However, when the vehicle makes a turn or moves on a curved trajectory, the velocity of the front portion of the vehicle may be perceived differently from the tail portion of the vehicle. An outer portion of the vehicle close to a sidewalk or away from a center of the street may be perceived to move at a different speed from an inner portion of the vehicle close to the center of the street. As such, calculating the velocity for various portions of the simulated object (e.g. vehicle) and including them in a velocity grid may improve the accuracy of tracking the simulated object by using the machine-learning algorithm.

The simulation engine may determine the velocity of the point that is representative of the portion of one of the simulated objects within a simulated scene using a processor.

In some embodiments, data representing a view of a simulated object by an autonomous vehicle can be obtained by using the simulation engine to simulate image data collected from simulated sensors on the autonomous vehicle, such as camera sensors or LiDAR sensors.

In some aspects, the simulation engine records or collects two consecutive 2D image frames of data with a delta time (e.g. 100 ms) to generate velocity for each 3D point that is representative of a portion of a simulated object or simulated object in the 2D image frame. Velocity data for each pixel can be obtained from the simulation engine. For example, the simulation engine can generate the 2D velocity grid including a plurality of velocity values and directions (i.e. velocity vectors) for a plurality of pixels representative of the simulated object(s) in the 2D image frame as described with respect to FIG. 5. In another example, the simulation engine takes two consecutive 3D frames of data with a delta time (e.g. 100 ms) to generate velocity for each 3D point that is representative of a portion of a simulated 3D object. The simulation engine can generate the 3D velocity grid including a plurality of velocity values and directions (i.e. velocity vectors) for a plurality of 3D points representative of the simulated object(s) in the 3D frame as described with respect to FIG. 7.

In accordance with some examples, the present technology includes storing the velocity of the point representative of the portion of one of the simulated objects in a velocity grid for the simulated objects in a memory device in an electrical communication with a processor. In some variations, the velocity of the point in a 2D velocity grid is associated with the first 2D image frame and the second 2D image frame. In some variations, the velocity of the point in a 3D velocity grid is associated with the first 3D frame and the second 3D frame.

In accordance with some examples, the present technology includes training a machine-learning algorithm for use by the autonomous vehicle using the velocity grid for the simulated objects in the simulated environment at block 830. For example, the simulation engine 200 illustrated in FIG. 2 may train the machine-learning algorithm for use by the autonomous vehicle using the velocity grid for the simulated objects in the simulated environment.

Figure 9:
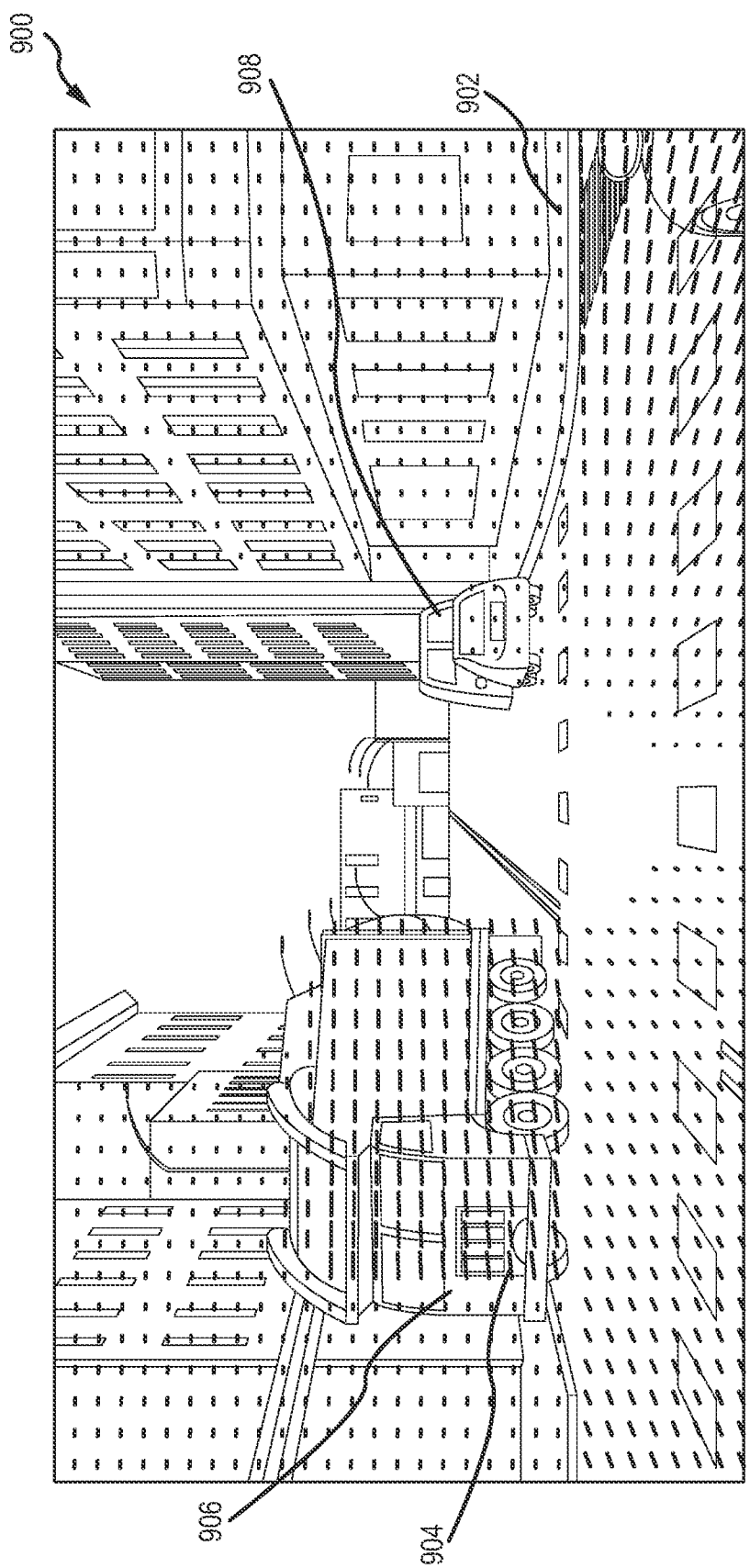
FIG. 9 illustrates an example 2D image frame including simulated objects and a 2D velocity grid generated for the simulated objects with the disclosed method.

FIG. 9 illustrates an example 2D image frame including simulated objects and a 2D velocity grid generated for the simulated objects with the disclosed method. The simulation recreates a road with simulated objects or virtual road actors at simulated locations based upon the image collected from the camera. As shown in FIG. 9, a 2D image frame 900 includes simulated street scenes, including a street, a street intersection, and buildings along both sides of the street. The 2D image frame also includes a moving vehicle 906 and a number of parked vehicles 908. The 2D image frame 900 includes a 2D velocity grid representative by velocity lines 904 at a plurality of pixels 902. Each pixel 902 has a velocity line or velocity labeling 904. Note that some velocity lines are longer than other velocity lines. Longer velocity lines are representative of higher velocity values. Also, the velocity lines 904 vary in directions and are representative of the velocity in a form of a vector. As shown, various velocity lines 904 are shown on different portions of the moving vehicle 906. The 2D image frame 900 can help train the machine-learning algorithm to achieve better results of simulated object tracking.

Figure 10:
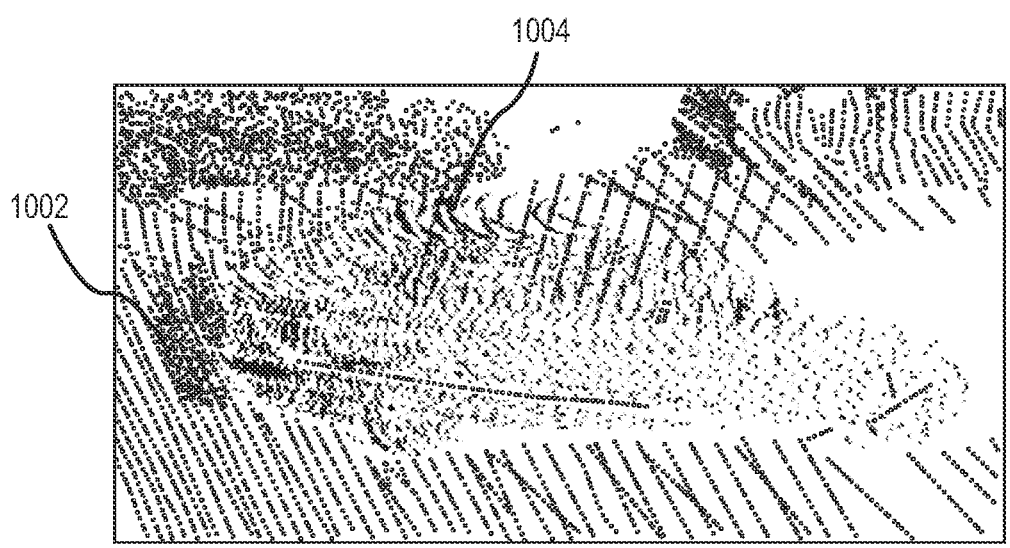
FIG. 10 illustrates an example 3D frame including simulated objects and a 3D velocity grid in accordance with some aspects of the disclosed technology.

FIG. 10 illustrates an example 3D frame including simulated objects and a 3D velocity grid in accordance with some aspects of the disclosed technology. As shown, a first frame 1000A includes a plurality of 3D points 1002 in a light color. A plurality of dots 1004 in grey color represents the 3D velocity grid for the 3D points 1002. As shown, the density of the dots 704 varies with the locations of the vehicle, which illustrates that the different portions of the vehicle have different velocity.

In a 2D view, color maps can be used to visualize the velocity and vehicles in 3D space. In the color maps, the color of each point represents velocity at this point. For example, blue color represents the lowest velocity, and red color represents the highest velocity.

The uniformity of color in a simulated object reveals that the velocity is constant for the simulated object. The variation of color in the simulated object reveals that the velocity varies with the portion of the simulated object.

In 3D view of point clouds, velocity lines can be revealed with the first and second 3D frames and illustrate variations in velocity.

The disclosure provides methods for generating velocity grids, which can be determined based upon a location of a simulated object at two consecutive times in a simulation as described above. The machine-learning algorithm may include a velocity grid perception model, which can improve detection of slowly-moving simulated objects. By augmenting the road scenario, simulation can produce more samples of slowly moving objects for training. The machine-learning algorithm can simulate road scenarios, and simulate slowly-moving objects for training autonomous vehicles.

In some aspects, a method is provided for training a machine-learning algorithm for piloting an autonomous vehicle using a velocity grid generated within a simulation.

Figure 11:
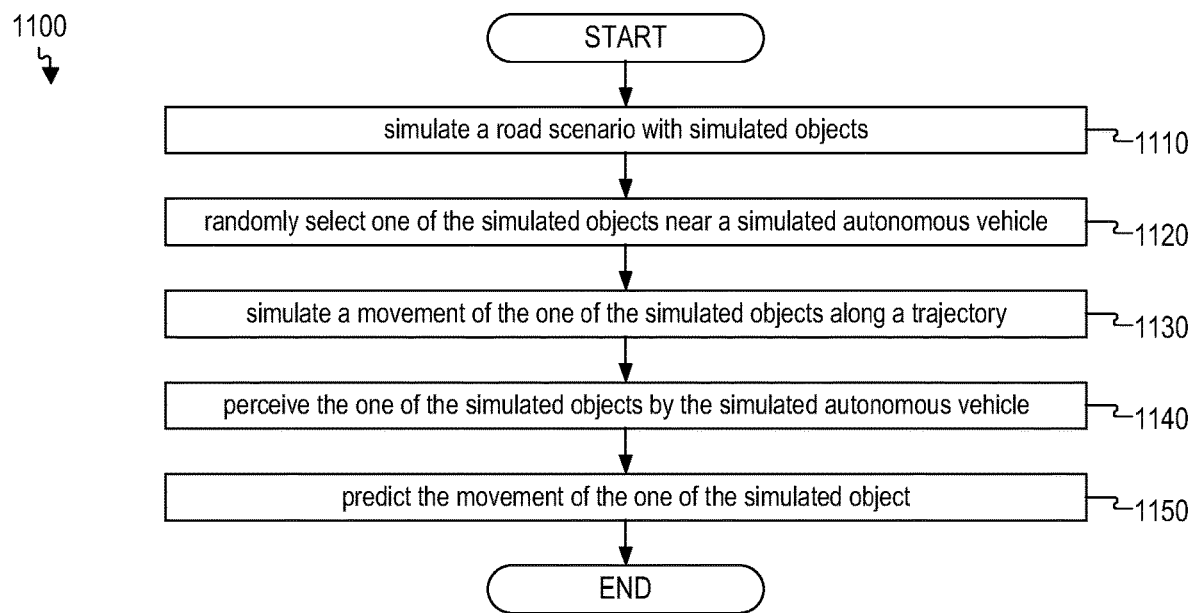
FIG. 11 is an example flow chart for training a machine-learning algorithm for piloting an autonomous vehicle using a simulated velocity grid in a simulated environment in accordance with some aspects of the disclosed technology.

FIG. 11 is an example flow chart for training a machine-learning algorithm for piloting an autonomous vehicle using a simulated velocity grid in a simulated environment in accordance with some aspects of the disclosed technology. The simulated velocity grid, such as 2D velocity grid, or 3D velocity grid, is generated as described above.

Although the example method 1100 depicts a particular sequence of operations, the sequence may be altered without departing from the scope of the present disclosure. For example, some of the operations depicted may be performed in parallel or in a different sequence that does not materially affect the function of method 1100. In other examples, different components of an example device or system that implements the method 1100 may perform functions at substantially the same time or in a specific sequence.

In accordance with some examples, the present technology includes simulating a road scenario with simulated non-player characters at block 1110. For example, the simulation engine 200 illustrated in FIG. 2 may simulate a road scenario with simulated non-player characters. The simulation engine 200 may use labeled AV data to create and simulate a drive for an autonomous vehicle in a simulation. Raw road data can be collected with cameras and LiDAR sensors mounted on the autonomous vehicle that drives on roads in a city. The collected data from cameras and LiDAR sensors can be captured in a container (e.g. a container for information recorded from autonomous vehicle's sensors and computers) and stored in a data storage device. 2D or 3D objects in the raw road data can be labeled, and these labels can be used to generate a simulated road scenario. The simulated objects may include simulated vehicles cars, trucks, pedestrians, bikes, among others. The simulation engine 200 can simulate locations of the simulated objects based upon the object labeling and simulate the motion or movement of the simulated objects.

For example, the machining learning algorithm can be trained to respond to a simulated road scenarios, such as a vehicle pulling off a street, turning right, turning left, or changing lanes. The machine-learning algorithm can be also trained to respond road scenarios on roads with different characteristics such as downhill or uphill in the simulated road scenario.

In some embodiments, the simulation engine 200 may add randomization to the trajectory. In some embodiments, the trajectory may be curved. In some embodiments, the simulation engine 200 may simulate one of the simulated objects to move at a speed ranging from 0.2 to 20.0 meters per second. In some variations, a range of slowly moving simulated object's velocity may range from 0.2 to 0.4 meters per second.

In accordance with some examples, the present technology includes selecting one of the simulated objects near a simulated autonomous vehicle in the road scenario at block 1120. For example, the simulation engine 200 illustrated in FIG. 2 may select one of the simulated objects near a simulated autonomous vehicle in the simulated road scenario. As an example, the simulation engine 200 may select one of the parked vehicles, bikes, skateboards, or pedestrians as the simulated objects.

In accordance with some examples, the present technology includes simulating a movement of one of the simulated objects along a trajectory at block 1130. For example, the simulation engine 200 illustrated in FIG. 2 may simulate a movement of one of the simulated objects along a trajectory. As an example, the simulation engine may simulate one of the simulated objects to change a lane to be in the same lane as the simulated autonomous vehicle.

In accordance with some examples, the present technology includes perceiving one of the simulated objects by the simulated autonomous vehicle through simulated LiDAR data at block 1140. For example, the simulation engine 200 illustrated in FIG. 2 may perceive one of the simulated objects by the simulated autonomous vehicle through simulated LiDAR data.

In accordance with some examples, the present technology includes predicting the movement of one of the simulated object with respect to the simulated autonomous vehicle by referencing the simulated LiDAR data against a stored velocity grid at block 1150. For example, the simulation engine 200 illustrated in FIG. 2 may predict the movement of one of the simulated object with respect to the simulated autonomous vehicle by reference to the simulated LiDAR data against a stored velocity grid. The stored velocity grid is created from a simulated environment, simulated movements of the simulated objects, and simulated perceptions of the simulated objects.

The disclosure demonstrates improvement in simulated object tracking and maneuver recognition by 20% with the machine-learning algorithm trained with the velocity grids generated in the simulated environment as described herein. The improvement in accuracy of the simulated object tracking is more noticeable especially in situations where the simulated object moves on a curved trajectory. For example, vehicles, bikes, scooters, skateboards may make an abrupt turn or change lanes. As an example, the simulated environment may include road topography, such as San Francisco's steep uphill or downhill streets, and curved roads. The accuracy of the machine-learning algorithm including the generated velocity grid for the simulated objects improves about 20% compared to the machine-learning algorithm without the generated velocity grid, but using a manually created velocity grid.

In some embodiments, the method may further include visualizing the velocity grid associated with the points.

In some embodiments, the time period for the movement of the point from the first location to the second location is 100 ms. The time period may range from 1 ms to 100 ms. The upper limit 100 ms is the time for the sensor to take a full scan, which may be used as a default value. If the time period is reduced to a smaller value, the sensor would produce partial scans. The lower limit 1 ms is the minimum simulation step length in the simulation engine.

In some embodiments, some simulated objects may be selected for velocity labeling. In real world, some vehicles are moving while some vehicles are parked. Thus, the simulation engine may create a reasonable scenario, where some objects are moving and some objects are stationary. The purpose of the selection of the simulated objects is for improving realism of the simulated environment.

There are three criteria for velocity augmentation or velocity labeling. First, the object for velocity augmentation is labeled as non-static in an original label. For example, the object is labeled manually as moving, but has no velocity information in the original label. Second, the simulation engine 200 may use semantic maps to identify a moving object. For example, cars or bikes in lanes can be moving objects, while cars in parking lots can be stationary objects. As such, the simulation engine may select the cars or bikes in lanes. Third, the simulation engine 200 may pick some parallel parked or diagonal parked vehicles to simulate joining traffic behavior. The simulation engine may also use semantic maps to find those vehicles and then pick some of the vehicles randomly.

Figure 12:
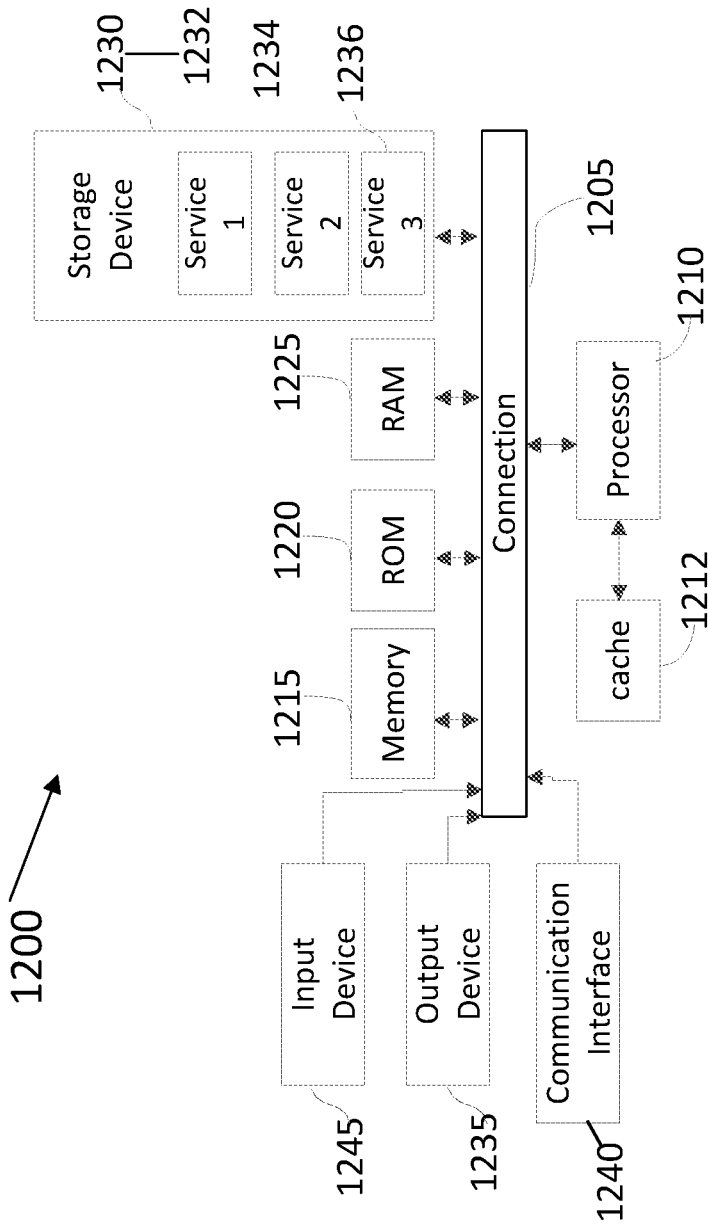
FIG. 12 illustrates an example processor-based system with which some aspects of the subject technology can be implemented.

FIG. 12 shows an example of computing system 1200, which can be for example any computing device making up internal computing system 110, remote computing system 150, (potential) passenger device executing rideshare app 170, or any component thereof in which the components of the system are in communication with each other using connection 1205. Connection 1205 can be a physical connection via a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement, and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods in accordance with the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods in accordance with described examples include magnetic or optical disks, solid-state memory devices, flash memory, USB devices provided with non-volatile memory, networked storage devices, and so on.

Devices implementing methods in accordance with these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for creating a velocity grid using a simulated environment for use by an autonomous vehicle, the method comprising:
   simulating a road scenario with simulated objects;
   recording image data collected from a camera sensor, the image data comprising a first two-dimensional (2D) image frame comprising the simulated objects made up of a plurality of pixels at a first location, and a second 2D image frame comprising the simulated objects made up of a plurality of pixels at a second location;
   identifying a first three-dimensional (3D) point on a first simulated object in a 3D view of the simulated road scenario, wherein the first 3D point corresponds to the first pixel in the first 2D image frame;

identifying a second 3D point on the first simulated object in a 3D view of the simulated road scenario, wherein the second 3D point corresponds to a first pixel in the second 2D image frame;

determining a distance between the first pixel in the first 2D image frame at the first location and the first pixel in the second 2D image frame at the second location during a simulated movement of the simulated object;

generating a velocity of the first point based upon the determined distance;

projecting the velocity back into the first 2D image frame; and encoding the velocity for the first pixel prior to a simulated movement of the simulated object with respect to a second pixel after the simulated movement of the simulated object in a 2D velocity grid.

2. The computer-implemented method of claim 1, the identifying a first three-dimensional (3D) point on the first simulated object comprising:

recording simulated LiDAR rays reflecting off the first simulated object; and determining the first 3D point that corresponds to the first pixel in the first two-dimensional (2D) image frame based upon intersection of the LiDAR rays and the first simulated object in the simulated road scenario.

3. The computer-implemented method of claim 1, the generating a velocity of the first three-dimensional (3D) point comprising:

simulating a movement of the first simulated object in the simulated road scenario in a period of time;

calculating the velocity of the first 3D point based upon the velocity of the first simulated object; and recording a second two-dimensional (2D) image frame after the simulated movement of the first simulated object, wherein a second 3D point corresponds to a second pixel in the second 2D image frame.

4. The computer-implemented method of claim 3, further comprising projecting the second three-dimensional (3D) point into the second two-dimensional (2D) image frame, wherein the second pixel corresponds to the same portion of the first simulated object as the first pixel.

5. The computer-implemented method of claim 1, wherein the velocity of the first simulated object is known in the simulated road scenario.

6. The computer-implemented method of claim 1, wherein a period of time for the simulated movement of the first simulated object is 100 ms between the first two-dimensional (2D) image frame and the second 2D image frame.

7. The computer-implemented method of claim 1, further comprising training the autonomous vehicle using a machine learning algorithm including the two-dimensional (2D) velocity grid of the simulated objects in the simulated environment.

8. A system for creating a velocity grid using a simulated environment for use by an autonomous vehicle, the system comprising:

one or more processors;

a computer-readable medium comprising instructions stored therein, which when executed by one or more processors, cause the processors to:

simulate a road scenario with simulated objects, record image data collected from a camera sensor, the image data comprising a first two-dimensional (2D) image frame comprising the simulated objects made up of a plurality of pixels at a first location, and a second 2D image frame comprising the simulated objects made up of a plurality of pixels at a second location, identify a first three-dimensional (3D) point on the first simulated object in a 3D view of the simulated road scenario, wherein the first 3D point corresponds to the first pixel in the first 2D image frame, identify a second 3D point on the first simulated object in a 3D view of the simulated road scenario, wherein the second 3D point corresponds to a first pixel in the second 2D image frame, determine a distance between the first pixel in the first 2D image frame at the first location and the first pixel in the second 2D image frame at the second location during a simulated movement of the simulated object, generate a velocity of the first point based upon the determined distance, project the velocity back into the first 2D image frame, and encode the velocity for the first pixel prior to a simulated movement of the simulated object with respect to a second pixel after the simulated movement of the simulated object in a 2D velocity grid.

9. The simulation system of claim 8, wherein the instructions to identify a first three-dimensional (3D) point on the first simulated object further cause the processors to:

record simulated LiDAR rays reflecting off the first simulated object; and determine the first 3D point that corresponds to the first pixel in the first two-dimensional (2D) image frame based upon intersection of the LiDAR rays and the first simulated object in the simulated road scenario.

10. The simulation system of claim 8, wherein the instructions to generate a velocity of the first three-dimensional (3D) point further cause the processors to:

simulate a movement of the first simulated object in the simulated road scenario in a period of time;

calculate the velocity of the first 3D point based upon the velocity of the first simulated object; and record a second two-dimensional (2D) image frame after the simulated movement of the first simulated object, wherein a second 3D point corresponds to a second pixel in the second 2D image frame.

11. The simulation system of claim 10, wherein the instructions further cause the processors to project the second three-dimensional (3D) point into the second two-dimensional (2D) image frame, wherein the second pixel corresponds to the same portion of the first simulated object as the first pixel.

12. The simulation system of claim 8, wherein the velocity of the first simulated object is known in the simulated road scenario.

13. The simulation system of claim 8, wherein a period of time for the simulated movement of the first simulated object is 100 ms between the first two-dimensional (2D) image frame and the second 2D image frame.

14. The simulation system of claim 8, wherein the instructions further cause the processors to train the autonomous vehicle using a machine learning algorithm including the two-dimensional (2D) velocity grid of the simulated objects in the simulated environment.

15. A non-transitory computer-readable storage medium comprising:

a storage configured to store instructions;

a processor configured to execute the instructions and cause the processor to:

simulate a road scenario with simulated objects, record image data collected from a camera sensor, the image data comprising a first two-dimensional (2D) image frame comprising the simulated objects made up of a plurality of pixels at a first location, and a second 2D image frame comprising the simulated objects made up of a plurality of pixels at a second location, identify a first three-dimensional (3D) point on the first simulated object in a 3D view of the simulated road scenario, wherein the first 3D point corresponds to the first pixel in the first 2D image frame, identify a second 3D point on the first simulated object in a 3D view of the simulated road scenario, wherein the second 3D point corresponds to a first pixel in the second 2D image frame, determine a distance between the first pixel in the first 2D image frame at the first location and the first pixel in the second 2D image frame at the second location during a simulated movement of the simulated object, generate a velocity of the first point based upon the determined distance, project the velocity back into the first 2D image frame, and encode the velocity for the first pixel prior to a simulated movement of the simulated object with respect to a second pixel after the simulated movement of the simulated object in a 2D velocity grid.

16. The non-transitory computer-readable storage medium of claim 15, wherein the instructions to identify a first three-dimensional (3D) point on the first simulated object further cause the processors to:

record simulated LiDAR rays reflecting off the first simulated object; and determine the first 3D point that corresponds to the first pixel in the first two-dimensional (2D) image frame based upon intersection of the LiDAR rays and the first simulated object in the simulated road scenario.

17. The non-transitory computer-readable storage medium of claim 15, wherein the instructions to generate a velocity of the first three-dimensional (3D) point further causes the processors to:

simulate a movement of the first simulated object in the simulated road scenario in a period of time;

calculate the velocity of the first 3D point based upon the velocity of the first simulated object; and record a second two-dimensional (2D) image frame after the simulated movement of the first simulated object, wherein a second 3D point corresponds to a second pixel in the second 2D image frame.

18. The non-transitory computer-readable storage medium of claim 17, wherein the instructions further cause the processors to project the second three-dimensional (3D) point into the second two-dimensional (2D) image frame, wherein the second pixel corresponds to the same portion of the first simulated object as the first pixel.

19. The non-transitory computer-readable storage medium of claim 15, wherein the velocity of the first simulated object is known in the simulated road scenario.

20. The non-transitory computer-readable storage medium of claim 15, wherein a period of time for the simulated movement of the first simulated object is 100 ms between the first two-dimensional (2D) image frame and the second 2D image frame.

* * * * *